US012610068B1

(12) United States Patent (10) Patent No.: US 12,610,068 B1
Edpalm et al. (45) Date of Patent: Apr. 21, 2026

(54) VIDEO ENCODING WITH ARTIFICIAL BOUNDARY REMOVAL

(71) Applicant: Axis AB, Lund (SE)

(72) Inventors: Viktor Edpalm, Lund (SE); Alexander Toresson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/979,132

(22) Filed: Dec. 12, 2024

(51) Int. Cl.
*H04N 19/196* (2014.01)
*H04N 19/105* (2014.01)
*H04N 19/176* (2014.01)

(52) U.S. Cl.
CPC ......... *H04N 19/196* (2014.11); *H04N 19/105* (2014.11); *H04N 19/176* (2014.11)

(58) Field of Classification Search
CPC ... H04N 19/196; H04N 19/105; H04N 19/176
USPC ............................................ 375/240, 240.02
See application file for complete search history.

(56) References Cited

U.S. PATENT DOCUMENTS

| | | | | |
|---|---|---|---|---|
| 9,398,301 | B2 * | 7/2016 | Ronca ................... | H04N 19/124 |
| 10,574,988 | B2 | 2/2020 | Thirumalai et al. | |
| 12,101,479 | B2 * | 9/2024 | Tanner ................. | H04N 19/172 |
| 12,206,874 | B1 * | 1/2025 | Waggoner ............ | H04N 19/182 |
| 2002/0181583 | A1 | 12/2002 | Corbera | |
| 2011/0255594 | A1 * | 10/2011 | Nagori ................. | H04N 19/126 |
| | | | | 375/240.03 |
| 2014/0321533 | A1 * | 10/2014 | Fatemian ............. | H04N 19/124 |
| | | | | 375/240.03 |
| 2017/0150150 | A1 * | 5/2017 | Thirumalai ........... | H04N 19/14 |
| 2020/0228801 | A1 * | 7/2020 | Tanner ................. | H04N 19/124 |
| 2023/0171409 | A1 * | 6/2023 | Edpalm ................ | H04N 19/105 |
| | | | | 375/240.13 |
| 2023/0199183 | A1 * | 6/2023 | Edpalm ................ | H04N 19/182 |
| | | | | 375/240.26 |
| 2024/0073432 | A1 * | 2/2024 | Rosewarne .......... | H04N 19/186 |

FOREIGN PATENT DOCUMENTS

| | | | | | |
|---|---|---|---|---|---|
| CA | 3051059 | A1 * | 8/2018 | .......... | H04N 19/124 |
| CN | 112585978 | A * | 3/2021 | ....... | H04N 21/85406 |
| CN | 113747153 | B | 6/2024 | | |
| CN | 120982101 | A * | 11/2025 | .......... | H04N 19/157 |
| EP | 1855485 | A2 | 11/2007 | | |
| EP | 3618440 | A1 * | 3/2020 | ............. | H04N 19/14 |
| TW | 1792578 | B * | 2/2023 | .......... | H04N 19/172 |
| WO | 2003041394 | A1 | 5/2003 | | |

* cited by examiner

*Primary Examiner* — Justin W Rider

(74) *Attorney, Agent, or Firm* — Volpe Koenig

(57) ABSTRACT

There is provided techniques for encoding video data composed of video frames. Each video frame is split into video frame portions. The video frame portions comprise blocks of video data. A method is performed by an image processing device implementing at least two video encoders. The method comprises encoding the blocks of video data using the video encoders with one video encoder per video frame portion. A quantization parameter to be used for encoding the blocks of video data that are at a border of any of the video frame portions that neighbours blocks of video data in another video frame portion is selected to a quantization parameter value that is lower than a default quantization parameter value for the blocks of video data.

16 Claims, 6 Drawing Sheets

100a

110a

130a

120a

100b

110b

130b

120b

200

210

214

212

216

220

VIDEO ENCODING WITH ARTIFICIAL BOUNDARY REMOVAL

TECHNICAL FIELD

Embodiments presented herein relate to a method, an image processing device, a computer program, and a computer program product for encoding video data composed of video frames.

BACKGROUND

The increasing demand for high-resolution cameras in applications such as video surveillance, security systems, as well as other application where advanced imaging technologies are needed, has increased the performance demands of the image processing hardware. Cameras for these applications produce substantial volumes of data, necessitating the development of processing technologies capable of handling the associated computational requirements.

One approach to addressing these demands involves the use of multiple processing units operating in parallel. The encoding workload can thereby be distributed, enabling the processing of video frames with large dimensions by dividing each video frame into smaller segments, or video frame portions. For example, a video frame composed of an image with a resolution of 7640-by-2160 pixels can be split into two video frame portions, each having a resolution of 7640-by-1080 pixels. Each video frame portion can be independently encoded on a separate processing unit. The resulting encoded data is subsequently combined in software to create a unified video stream of encoded video frames. This approach is supported by standard video compression formats, such as H.264 and H.265, and the like.

While the above-described splitting and encoding technique effectively addresses challenges related to processing and scalability, it introduces a potential artifact at the boundary where the video frame portions meet. For many scenes, this boundary is not readily perceptible. However, in other scenes the boundary becomes distinctly visible.

Reference is here made to FIGS. 1A and 1B. In FIG. 1A is shown a part 100a of a video frame having been encoded using the aforementioned splitting approach where the video frame is horizontally split into two halves, a top half 110a and a bottom half 120a, and where the two halves of the video frame are encoded individually. It can be observed that visual artifacts, resulting from the encoding, have been introduced in a bottom portion 130a of the upper half. In FIG. 1B is provided a schematic illustration of a part 100b of a video frame with the same effect as occurring in FIG. 1A, but for another scene. The video frame is horizontally split into two halves, a top half 110b and a bottom half 120b, and the two halves of the video frame have been encoded individually. The scene in FIG. 1B represents a chequered pattern and visual artifacts can be seen in the bottom portion 130b of the upper half 110b.

In view of the above, although the splitting approach resolves many technical challenges associated with high-resolution image processing, the issue of visible boundaries remains to be addressed.

Hence, there is a need for improved encoding of video frames.

SUMMARY

An object of embodiments herein is to address the above issues.

A particular object is to avoid the above-disclosed artifacts but still allow the video data to be encoded using a splitting approach.

According to a first aspect there is presented a method for encoding video data composed of video frames. Each video frame is split into video frame portions. The video frame portions comprise blocks of video data. The method is performed by an image processing device implementing at least two video encoders. The method comprises encoding the blocks of video data using the video encoders with one video encoder per video frame portion. A quantization parameter to be used for encoding the blocks of video data that are at a border of any of the video frame portions that neighbours blocks of video data in another video frame portion is selected to a quantization parameter value that is lower than a default quantization parameter value for the blocks of video data.

According to a second aspect there is presented an image processing device for encoding video data composed of video frames. Each video frame is split into video frame portions. The video frame portions comprise blocks of video data. The image processing device implementing at least two video encoders and comprising processing circuitry. The processing circuitry is configured to cause the image processing device to encode the blocks of video data using the video encoders with one video encoder per video frame portion. A quantization parameter to be used for encoding the blocks of video data that are at a border of any of the video frame portions that neighbours blocks of video data in another video frame portion is selected to a quantization parameter value that is lower than a default quantization parameter value for the blocks of video data.

According to a third aspect there is presented a computer program for encoding video data composed of video frames. Each video frame is split into video frame portions. The video frame portions comprise blocks of video data. The computer program comprises computer code which, when run on processing circuitry of an image processing device implementing at least two video encoders, causes the image processing device to perform actions. One action comprises the image processing device to encode the blocks of video data using the video encoders with one video encoder per video frame portion. A quantization parameter to be used for encoding the blocks of video data that are at a border of any of the video frame portions that neighbours blocks of video data in another video frame portion is selected to a quantization parameter value that is lower than a default quantization parameter value for the blocks of video data.

According to a fourth aspect there is presented a computer program product comprising a computer program according to the fourth aspect and a computer readable storage medium on which the computer program is stored. The computer readable storage medium could be a non-transitory computer readable storage medium.

Advantageously, these aspects resolve, or at least mitigate or reduce, issues pertaining to the aforementioned artifacts.

Advantageously, these aspects avoid the aforementioned artifacts but still enable the video data to be encoded using a splitting approach.

Advantageously, these aspects enable the blocks of video data directly above and below the border to another video frame portion to get a QP boost, thereby reducing the aforementioned artifacts.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
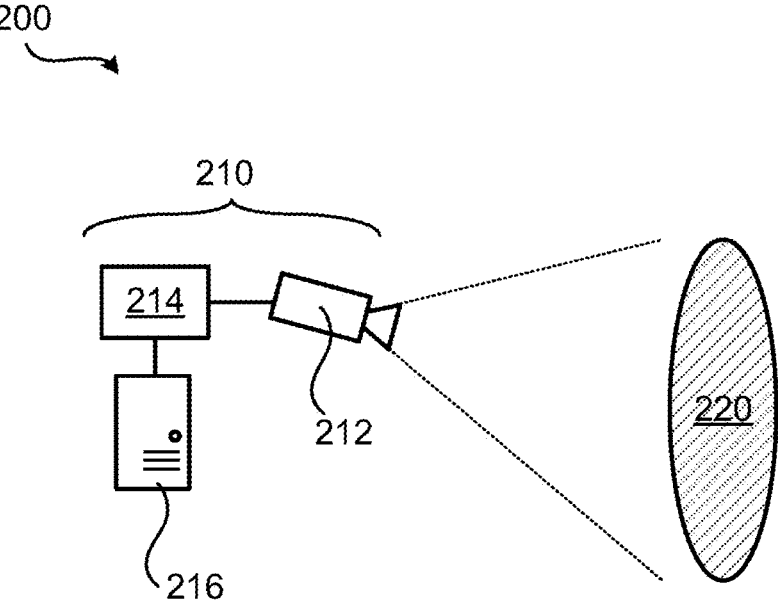
FIG. 2 is a block diagram of an image processing device used for capturing video data of a scene according to embodiments.

FIG. 2 is a schematic diagram illustrating a scenario where an image processing device 210 is used for capturing video data of a scene 220. The image processing device 210 comprises a camera device 212. The camera device 212 is configured to capture video data composed of video frames. In some examples the camera device 212 is a digital camera device and/or capable of pan, tilt and zoom (PTZ) and can thus be regarded as a (digital) PTZ camera device. Further, the image processing device 210 is configured to encode the video frames such that the video data can be decoded using any known video coding standard, such as any of: High Efficiency Video Coding (HEVC), also known as H.265 and MPEG-H Part 2; Advanced Video Coding (AVC), also known as H.264 and MPEG-4 Part 20; Versatile Video Coding (VVC), also known as H.266, MPEG-I Part 3 and Future Video Coding (FVC); VP9, VP10, AOMedia Video 1 (AV1), and AOMedia Video 2 (AV2), just to give some examples. In this respect, the encoding might be performed either directly in conjunction with the camera device 212 capturing the image frames or at another entity, such as in a dedicated image encoder 214, and then, at least temporarily, stored in a database 216, for later retrieval, decoding, and viewing.

In this respect, it is assumed that the encoding of the video frames is based on splitting each of the video frames into at least two video frame portions, where these at least two video frame portions are individually encoded with respect to each other. As noted above, this splitting approach could result in that potential artifacts are introduced at the boundary where the video frame portions meet.

One non-limiting example of where the issue occurs is when new I-blocks are generated, such as in the bottom row of 16-by-16 blocks in the top half of the video frame, during slight upward camera movements (by 1 to 15 pixels), and vice versa during slight downward camera movements. The same issue may occur when new I-blocks are generated, such as in the right-most column of 16-by-16 blocks in the left half of the video frame, during slight leftward camera movements (by 1 to 15 pixels), and vice versa during slight rightward camera movements. These newly generated blocks are encoded using the P-frame's quantization parameter (QP) map (QMAP), which usually applies a higher level of compression. Specifically, the P-frame QMAP uses several higher QP steps compared to the I-frame QMAP, meaning the quality of these blocks may be lower due to more aggressive compression, resulting in visible artifacts or reduced detail, as in FIGS. 1A and 1B.

At least some of the herein disclosed embodiments are therefore based on giving the blocks of data adjacent another half of the video frame a QP boost (i.e., to reduce the quantization) to make it the same as the block of data had at the I-frame. Improving the quality too much will hide the border between the two halves of the video frame the better, but instead create a visible "line", or "band" of higher quality (and cost more bitrate). Selecting the quantization level that was used in the previous I-frame is a good compromise, but there can also be other ways to select the quantization level, as will be disclosed below. For example, there may be cases where the surrounding blocks of data are encoded as I-frames and hence a visible "line", or "band" of lower quality may be produced if the quantization level is not carefully selected.

The embodiments disclosed herein in particular relate to techniques for encoding video data composed of video frames. In order to obtain such techniques, there is provided an image processing device, a method performed by the image processing device, a computer program product comprising code, for example in the form of a computer program, that when run on an image processing device, causes the image processing device to perform the method.

Figure 3:
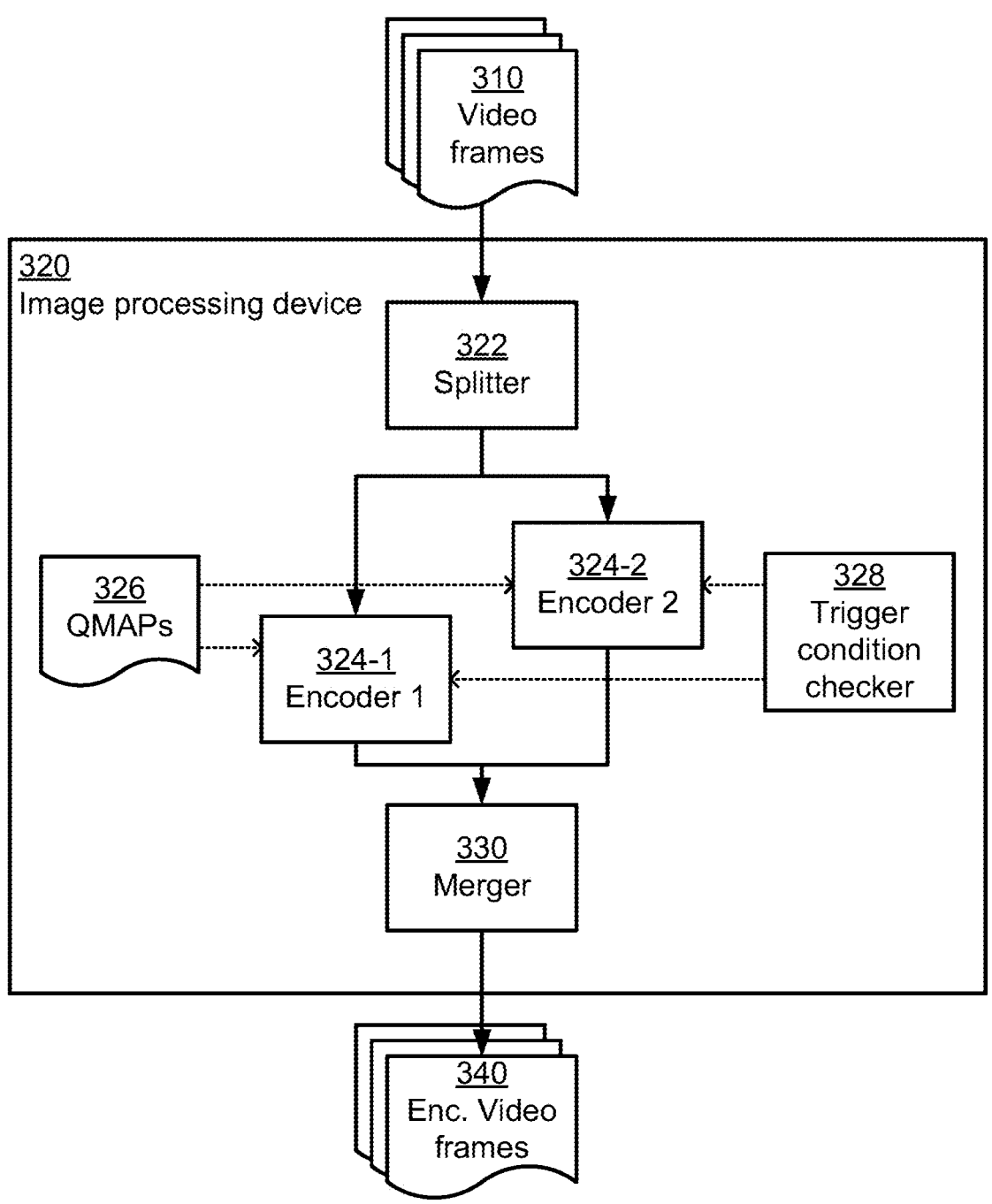
FIG. 3 is block diagram of an image processing device according to an embodiment.

FIG. 3 is a block diagram of an image processing device 320 configured to encode video frames 310. The image processing device 320 comprises a splitter 322 to which incoming video frames 310 are directed. The splitter 322 is configured to divide the video frames 310 into separate segments, or video frame portions, for independent processing. The video frame portions are processed by two encoders 324-1, 324-2, as represented by encoder 1 and encoder 2. The image processing device may be configured to operate without exchanging any reference data between the at least two video encoders 214, 324-1, 324-2. As will be further disclosed below, the image processing device may comprise at least two processing chips, and each of the video encoders may be implemented in a respective processing chip. Each of the encoders 324-1, 324-2 receives a respective video frame portion of the same video frame 310 and utilizes QMAPs 326 to assist in the encoding, in order to achieve compression whilst maintaining a specific quality level. The QMAPs 326 specify quantization levels on a block-level for encoding blocks of the video data in the video frame portions. A trigger condition checker 328 is configured to check whether a trigger condition is fulfilled for the blocks of video data to be encoded. Examples of trigger condition will be disclosed below. In case the trigger condition is not fulfilled for a given block of video data, this given block of video data is encoded using a default QP value. However, in case the trigger condition is fulfilled for the given block of video data, then the given block of video data is encoded using some other QP value than the default QP value. Examples of how this other QP value can be selected will be provided below. Once both encoders 324-1, 324-2 complete their individual processing, the output, i.e., the respective encoded video frame portions, are forwarded to a merger 330. The merger 330 is configured to combine the encoded video frame portions into a unified stream of encoded video frames 340.

Figure 4:
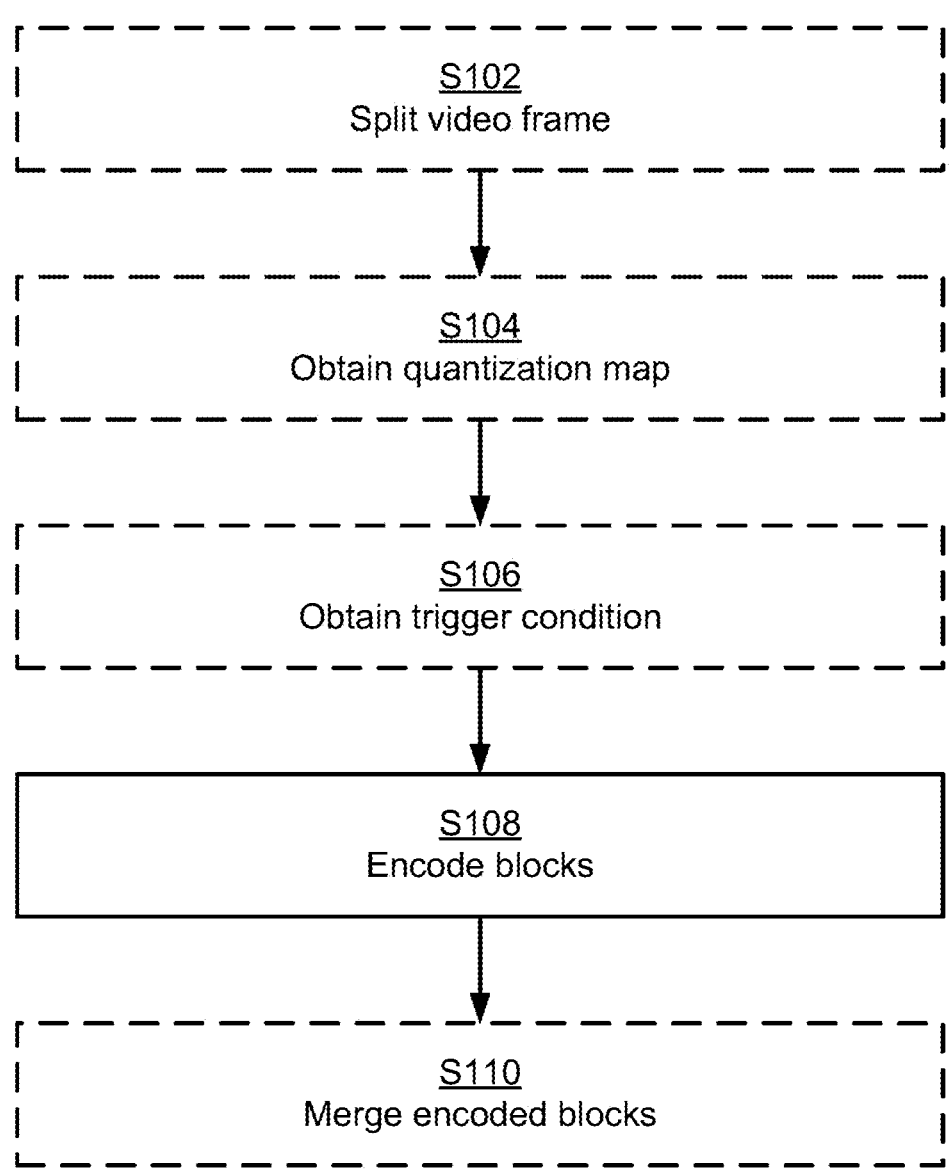
FIG. 4 is a flowchart of methods according to embodiments.

FIG. 4 is a flowchart illustrating embodiments of methods for encoding video data composed of video frames. Each video frame 310 is split into video frame portions. The video frame portions comprise blocks of video data. The methods are performed by the image processing device 210, 320. The image processing device 210, 320 implements at least two video encoders 214, 324-1, 324-2. The methods are advantageously provided as computer programs.

S108: The image processing device 210, 320 encodes the blocks of video data using the video encoders 214, 324-1, 324-2 with one video encoder 214, 324-1, 324-2 per video frame portion. The blocks of video data may be inter-coded in relation to a reference video frame 310. Step S108 can be implemented by the encoders 324-1, 324-2.

A QP (also referred to as quantization index, compression level, or compression parameter) to be used for encoding the blocks of video data that are at a border of any of the video frame portions that neighbours blocks of video data in another video frame portion is selected to a QP value that is lower than a default QP value for the blocks of video data.

This enables the blocks of video data directly above and below the border to another video frame portion to get a QP boost.

The selected QP value may have a fixed offset to the default QP value. Additionally, or alternatively, the selected QP value may be selected as a QP value used for encoding corresponding blocks of video data in a latest intra-coded video frame 310 of the video data.

Embodiments relating to further details of encoding video data composed of video frames as performed by the image processing device 210, 320 will now be disclosed with continued reference to FIG. 4.

As disclosed above, each video frame 310 is split into video frame portions. Therefore, in some embodiments, the image processing device 210, 320 is configured to perform (optional) step S102.

S102: The image processing device 210, 320 splits each video frame 310 of the video data into video frame portions. The border is then formed between the video frame portions. Step S102 can be implemented by the splitter 322.

In general terms, the QP values can be extracted from QMAPs 326, as in FIG. 3. Therefore, in some embodiments, the image processing device 210, 320 is configured to perform (optional) step S104.

S104: The image processing device 210, 320 obtains a QMAP 326.

The QMAP 326 specifies quantization levels on a block-level for encoding the blocks of video data in the video frame portions, and the QMAP 326 comprises a respective default QP for the blocks of video data.

In some aspects, the selected QP value results in less quantization than the default QP value, and thus a higher bitrate. Therefore, in some aspects, the selected QP value is to be used for encoding the blocks of video data that are at a border of any of the video frame portions that neighbours blocks of video data in another video frame portion only when some trigger condition is received. Therefore, in some embodiments, the image processing device 210, 320 is configured to perform (optional) step S106.

S106: The image processing device 210, 320 obtains a trigger condition for encoding the blocks of video data using the selected QP value.

In general terms, the trigger condition should only be associated with scenarios where the aforementioned artifacts may arise. For example, the aforementioned artifacts may arise when the quantization level is higher than normal, when there is a wide vertical region spanning a chip boundary with pixel-level detail but block-level uniformity and relative stationarity in the scene, and when there is movement of the camera, such as a slight shaking motion with an amplitude of just a few pixels, relative the scene. A chip boundary is another term for the border between two video frame portions in the video frame. Either the camera may be moved, or there is a uniform movement in the scene. The uniform movement in the scene may be caused by a weather condition (e.g., a scenario depicting a field of grass impacted by wind, or a scenario depicting a body of water with moving waves, etc.) or some naturally-occurring optical phenomenon (e.g., mirage, atmospheric refraction, etc.). Hence, in some embodiments, the trigger condition pertains to at least one of: a base quantization level of the video frame 310 exceeds a threshold, image content in a pixel area around the border has details on a pixel level but is uniform at a block level, a camera 112 used for capturing the video data having moved, relative a scene of which video frames are captured, between capturing the video frame 310 and a reference video frame 310. With respect to the base quantization level, the video frame is generally associated with a base quantization level and a QMAP that describes a difference relative the base quantization level for each block of video data to be encoded. The QMAP can thus be defined relative the base quantization level. Image content in a pixel area around the border that has details on a pixel level but is uniform at a block level can be identified based on average pixel values and variance per block of video data. For example, such a pixel area may be characterized by the average pixel value per block being similar within some similarity threshold, while the variance of the pixel values in the blocks exceeds a variability threshold.

If camera shaking has been observed, then more blocks of video data can be encoded with the selected QP level. The amount of blocks of video data to be encoded with the selected QP level can be determined by the shaking level; the higher the shaking level, the higher the number of blocks of video data that is encoded with the selected QP level. Hence, in some embodiments, that the camera has moved represents camera shaking during capture of the video data. How many blocks of video data to encode using the selected QP value is determined by the level of camera shaking. For example, for a comparatively low shaking level, only the line of blocks of video along the border will be encoded using the selected QP value. Likewise, for example, for a comparatively high shaking level, not only the line of blocks of video along the border will be encoded using the selected QP value, but also blocks of video neighbouring this line of blocks of video.

In case the camera has panned vertically and moved upwards, then artifacts may be visible in the lower portion, and more blocks in the lower portion may then be encoded with the selected QP level, and vice versa. Assume thus that the camera movement represents a vertical movement during capture of the video data. When the vertical movement is upwards, how many blocks of video data to encode using the selected QP value is higher in video frame portions below the border than for video frame portions above the border. Correspondingly, when the vertical movement is downwards, how many blocks of video data to encode using the selected QP value is higher in video frame portions above the border than for video frame portions below the border.

Likewise, when the camera has panned horizontally and moved from the left towards the right, then artifacts may be visible in the left part and more blocks in left part may thus be encoded with the selected QP level, and vice versa. Assume thus that the camera movement represents a horizontal movement during capture of the video data. When the horizontal movement is rightwards, how many blocks of video data to encode using the selected QP value is higher in video frame portions leftwards of the border than for video frame portions rightwards of the border. Correspondingly, when the horizontal movement is leftwards, how many blocks of video data to encode using the selected QP value is higher in video frame portions rightwards of the border than for video frame portions leftwards of the border.

The same principles apply also for diagonal camera movements.

As in FIG. 3, once the blocks of video data have been encoded, the thus encoded blocks of video data may be combined into a unified stream of encoded video frames 340. Hence, in some embodiments, the image processing device 210, 320 is configured to perform (optional) step S110.

S110: The image processing device 210, 320 merges the encoded blocks of video data as respective slices, or tiles, of a common encoding of the video frame 310.

Step S110 can be implemented by the merger 330.

Figures 1A, 1B:
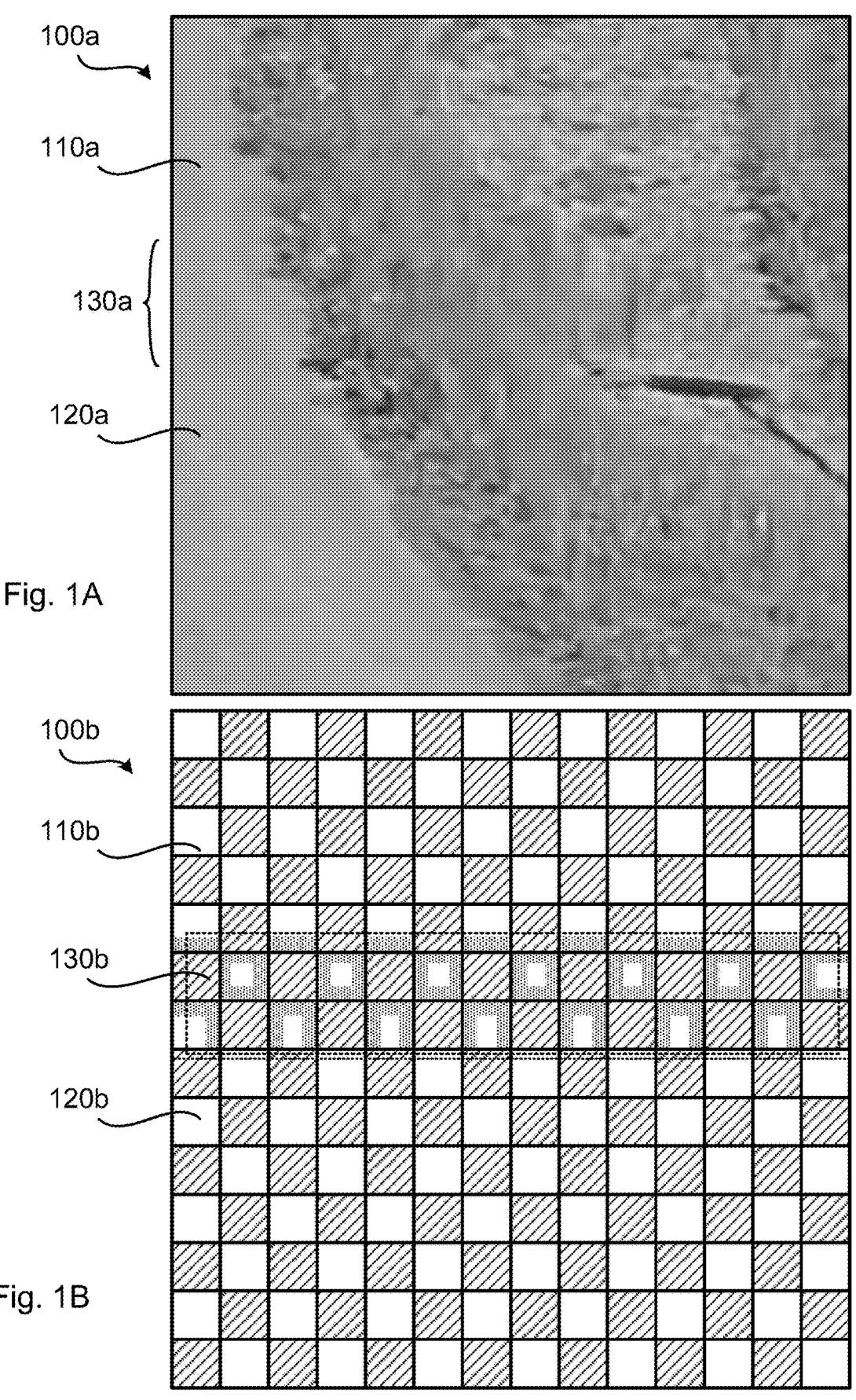
FIGS. 1A and 1B show parts of video frames having been encoded using a splitting approach according to examples.
Figures 5A, 5B:
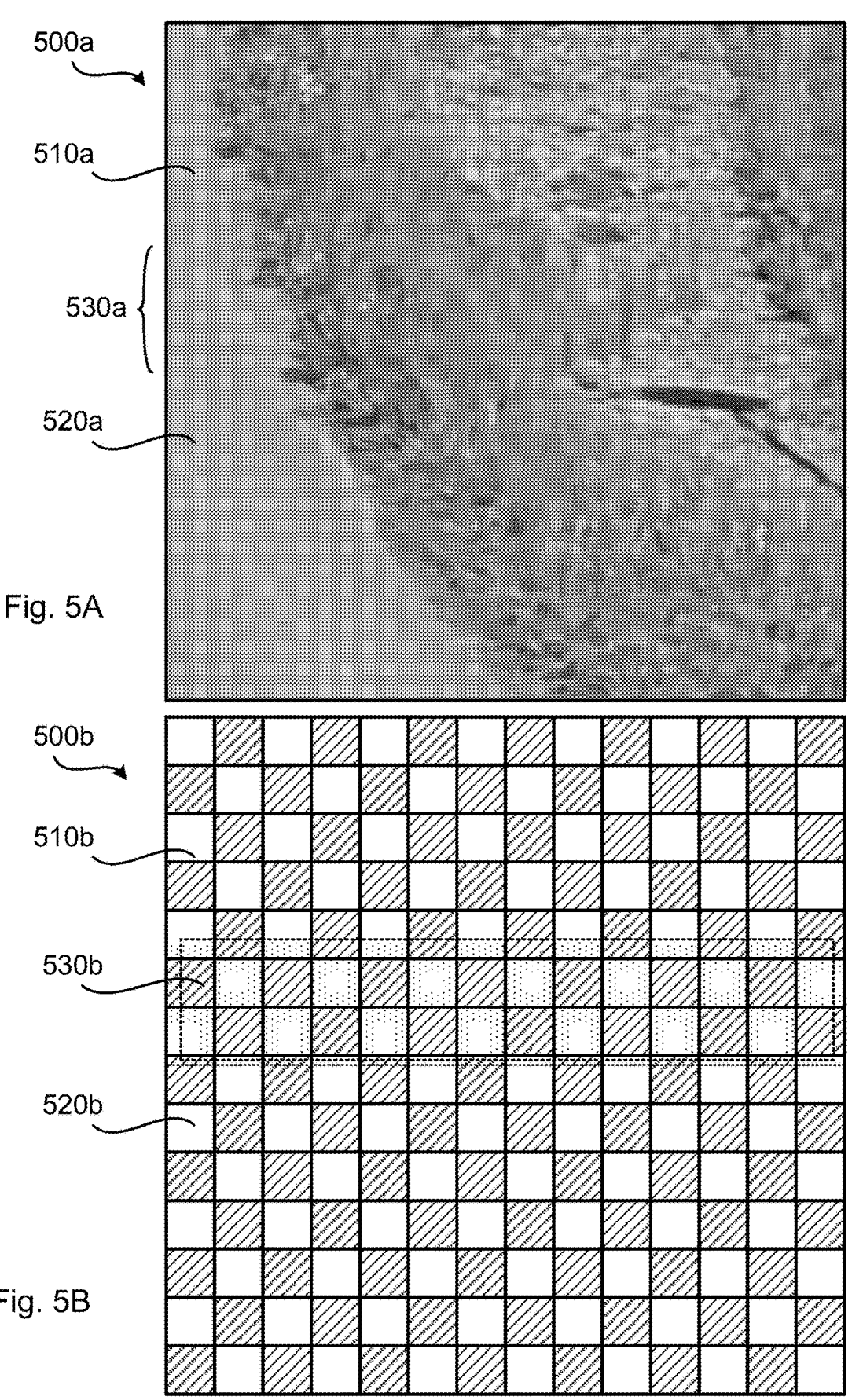
FIGS. 5A and 5B show parts of video frames having been encoded according to herein disclosed embodiments.

Reference is here made to FIGS. 5A and 5B. In FIG. 5A is shown a part 500a of the same video frame as shown in FIG. 1A. The video frame is horizontally split into two halves, a top half 510a and a bottom half 520a, and the two halves of the video frame have been encoded individually using the herein disclosed methods. It can be observed that the visual artifacts in the bottom portion 530a of the upper half have been reduced in comparison to the bottom portion 130a in FIG. 1A. In FIG. 5B is provided a schematic illustration of a part 500b of a video frame for the same scene as in FIG. 1B. The video frame is horizontally split into two halves, a top half 510b and a bottom half 520b, and the two halves of the video frame have been encoded individually. In FIG. 5B it can be observed that the visual artifacts in the bottom portion 530b of the upper half 510b have been reduced in comparison to the bottom portion 130b in FIG. 1B.

Figure 6:
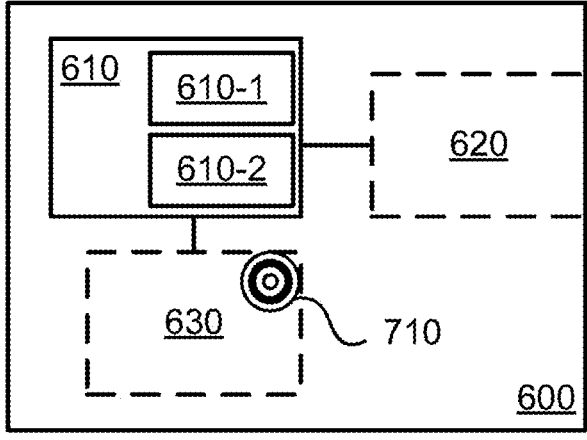
FIG. 6 is a schematic diagram showing structural units of an image processing device according to an embodiment.

It is noted that step S108 specifies that the blocks of video data are encoded using one video encoder 214, 324-1, 324-2 per video frame portion. However, the herein disclosed inventive concept can also be applied to image processing devices having just one single encoder, where this single encoder encodes both blocks of video data, one after the other, but without passing any side information from encoding one of the blocks of video data to the next. Likewise, although the examples in FIGS. 5A and 5B show a video frame being horizontally split into two halves, the video frame can likewise be vertically split into two halves, etc. Further, the video frame can be split into more parts than just two halves (such as into slices, tiles, etc.), where each such part can be individually encoded in accordance with the herein disclosed embodiments. Each such part can be encoded using a respective encoder, or using one and the same encoder, one part at a time FIG. 6 schematically illustrates, in terms of a number of structural units, the components of an image processing device 600 according to an embodiment. Processing circuitry 610 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 630. The processing circuitry 610 may further be provided as at least one application specific integrated circuit (ASIC), or field programmable gate array (FPGA).

Particularly, the processing circuitry 610 is configured to cause the image processing device 600 to perform a set of operations, or steps, as disclosed above. For example, the storage medium 630 may store the set of operations, and the processing circuitry 610 may be configured to retrieve the set of operations from the storage medium 630 to cause the image processing device 600 to perform the set of operations. The set of operations may be provided as a set of executable instructions. The processing circuitry 610 comprises processing chips 610-1, 610-2. Each of the processing chips 610-1, 610-2 may implement a respective encoder 324-1, 324-2. Thus, the processing circuitry 610 is thereby arranged to execute methods as herein disclosed. The storage medium 630 may also comprise persistent storage, which, for example, can be any single one or combination of magnetic memory, optical memory, solid state memory or even remotely mounted memory.

The image processing device 600 may further comprise a communications (comm.) interface 620 at least configured for communications with other entities, functions, nodes, and devices, as in FIG. 2. As such the communications interface 620 may comprise one or more transmitters and receivers, comprising analogue and digital components. The processing circuitry 610 controls the general operation of the image processing device 600 e.g. by sending data and control signals to the communications interface 620 and the storage medium 630, by receiving data and reports from the communications interface 620, and by retrieving data and instructions from the storage medium 630. Other components, as well as the related functionality, of the image processing device 600 are omitted in order not to obscure the concepts presented herein.

The image processing device 600 may be provided as a standalone device or as a part of at least one further device. For example, the image processing device 600 may be part of a video surveillance system, or a security system, or the like. A first portion of the instructions performed by the image processing device 600 may be executed in a first device, and a second portion of the the of the instructions performed by the image processing device 600 may be executed in a second device; the herein disclosed embodiments are not limited to any particular number of devices on which the instructions performed by the image processing device 600 may be executed. Hence, the methods according to the herein disclosed embodiments are suitable to be performed by an image processing device 600 residing in a cloud computational environment. Therefore, although a single processing circuitry 610 is illustrated in FIG. 6 the processing circuitry 610 may be distributed among a plurality of devices, or nodes. The same applies to the computer program 720 of FIG. 7.

Figure 7:
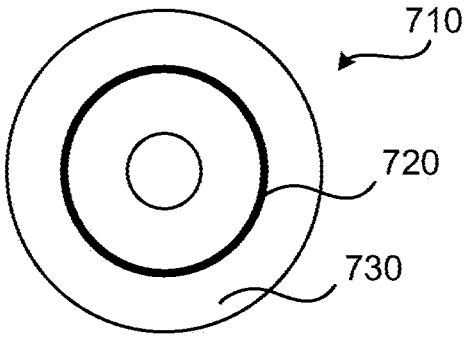
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 610 and thereto operatively coupled entities and devices, such as the communications interface 620 and the storage medium 630, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for encoding video data comprising video frames, each video frame being split into video frame portions comprising blocks of video data, wherein the method is performed by an image processing device implementing at least two video encoders, and wherein the method comprises:

encoding the blocks of video data using the video encoders with one video encoder per video frame portion, wherein a quantization parameter (QP) to be used for encoding the blocks of video data that are at a border of any of the video frame portions that neighbours blocks of video data in another video frame portion is selected to a QP value that is lower than a default QP value for the blocks of video data.

2. The method according to claim 1, wherein the method further comprises:

splitting said each video frame of the video data into said video frame portions, wherein said border is formed between said video frame portions.

3. The method according to claim 1, wherein the method further comprises:

obtaining a QP map, wherein the QP map specifies quantization levels on a block-level for encoding the blocks of video data in the video frame portions, and wherein the QP map comprises a respective default QP for the blocks of video data.

4. The method according to claim 1, wherein the method further comprises:

obtaining a trigger condition for encoding the blocks of video data using the selected QP value.

5. The method according to claim 4, wherein the trigger condition pertains to at least one of:

a base quantization level of the video frame exceeds a threshold, image content in a pixel area around the border has details on a pixel level but is uniform at a block level, a camera used for capturing the video data having moved, relative a scene of which video frames are captured, between capturing the video frame and a reference video frame.

6. The method according to claim 5, wherein that the camera has moved represents camera shaking during capture of the video data, and wherein the number of blocks of video data to encode using the selected QP value is determined by a level of the camera shaking.

7. The method according to claim 5, wherein camera movement represents a vertical movement during capture of the video data, wherein when the vertical movement is upwards, the number of blocks of video data to encode using the selected QP value is higher in video frame portions below the border than for video frame portions above the border, and wherein when the vertical movement is downwards, the number of blocks of video data to encode using the selected QP value is higher in video frame portions above the border than for video frame portions below the border.

8. The method according to claim 5, wherein camera movement represents a horizontal movement during capture of the video data, wherein when the horizontal movement is rightwards, the number of blocks of video data to encode using the selected QP value is higher in video frame portions leftwards of the border than for video frame portions rightwards of the border, and when the horizontal movement is leftwards, the number of blocks of video data to encode using the selected QP value is higher in video frame portions rightwards of the border than for video frame portions leftwards of the border.

9. The method according to claim 1, wherein the blocks of video data are inter-coded in relation to a reference video frame.

10. The method according to claim 1, wherein the selected QP value has a fixed offset to the default QP value.

11. The method according to claim 1, wherein the selected QP value is selected as a QP value used for encoding corresponding blocks of video data in a latest intra-coded video frame of the video data.

12. The method according to claim 1, wherein the method further comprises:

merging the encoded blocks of video data as respective slices, or tiles, of a common encoding of the video frame.

13. The method according to claim 1, wherein the image processing device comprises at least two processing chips, and wherein each of the at least two video encoders is implemented in a respective processing chip.

14. The method according to claim 1, wherein the image processing device is configured to operate without exchanging any reference data between the at least two video encoders.

15. An image processing device for encoding video data comprising video frames, wherein each video frame is split into video frame portions and the video frame portions comprise blocks of video data, the image processing device implementing at least two video encoders and comprising processing circuitry, the processing circuitry being configured to cause the image processing device to:

encode the blocks of video data using the video encoders with one video encoder per video frame portion, wherein a quantization parameter (QP) to be used for encoding the blocks of video data that are at a border of any of the video frame portions that neighbours blocks of video data in another video frame portion is selected to a QP value that is lower than a default QP value for the blocks of video data.

16. A computer program product for encoding video data comprising video frames, each video frame being split into video frame portions and the video frame portions comprise blocks of video data, the computer program product comprising a computer program and a non-volatile computer readable storage medium on which the computer program is stored, the computer program comprising computer code which, when run on processing circuitry of an image processing device implementing at least two video encoders, causes the image processing device to:

encode the blocks of video data using the video encoders with one video encoder per video frame portion, wherein a quantization parameter, QP, to be used for encoding the blocks of video data that are at a border of any of the video frame portions that neighbours blocks of video data in another video frame portion is selected to a QP value that is lower than a default QP value for the blocks of video data.

\* \* \* \* \*